(12) United States Patent
Tazume et al.

(10) Patent No.: US 11,893,867 B2
(45) Date of Patent: Feb. 6, 2024

(54) MONITORING SYSTEM AND UNMANNED GROUND VEHICLE

(71) Applicant: Rakuten Group, Inc., Tokyo (JP)

(72) Inventors: Toshiaki Tazume, Tokyo (JP); Daiki Tanaka, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 211 days.

(21) Appl. No.: 17/621,484

(22) PCT Filed: Dec. 22, 2020

(86) PCT No.: PCT/JP2020/047980
§ 371 (c)(1),
(2) Date: Dec. 21, 2021

(87) PCT Pub. No.: WO2022/137350
PCT Pub. Date: Jun. 30, 2022

(65) Prior Publication Data
US 2022/0398908 A1 Dec. 15, 2022

(51) Int. Cl.
| | |
|---|---|
| *G08B 13/196* | (2006.01) |
| *G06V 20/52* | (2022.01) |
| *G06V 20/40* | (2022.01) |
| *G06V 40/16* | (2022.01) |
| *G06V 40/20* | (2022.01) |
| *G06V 20/56* | (2022.01) |

(Continued)

(52) U.S. Cl.
CPC ..... *G08B 13/19647* (2013.01); *G05D 1/0246* (2013.01); *G06V 20/46* (2022.01); *G06V 20/52* (2022.01); *G06V 20/56* (2022.01); *G06V 40/172* (2022.01); *G06V 40/20* (2022.01); *G08B 7/06* (2013.01); *G08B 13/19613* (2013.01); *G05D 2201/0213* (2013.01)

(58) Field of Classification Search
CPC ............. G08B 13/19647; G08B 7/06; G08B 13/19613; G06V 20/52; G06V 20/46; G06V 40/172; G06V 40/20; G06V 20/56; G05D 1/0246
USPC ........................................... 340/541
See application file for complete search history.

(56) References Cited

U.S. PATENT DOCUMENTS 7,233,243 B2 * 6/2007 Roche ................ G08B 13/1618
340/565
10,474,168 B1 * 11/2019 Graham .................. B64D 5/00
(Continued)

FOREIGN PATENT DOCUMENTS

| | | |
|---|---|---|
| JP | 2004-21604 A | 1/2004 |
| JP | 2020-7148 A | 1/2020 |
| WO | 2020/180453 A1 | 9/2020 |

*Primary Examiner* — Kerri L McNally
(74) *Attorney, Agent, or Firm* — Sughrue Mion, PLLC

(57) ABSTRACT

An UGV 1 acquires a moving image of an captured imaging area, detects a receiver of an article on the basis of frame images forming the moving image, sets, as the monitoring area, an area including at least a part of the receiver and the area at a point in time when the receiver appears, detects a outsider entering the monitoring area or a outsider heading for the monitoring area on the basis of a frame image that is temporally later than a first frame image at the point in time when the receiver appears, and executes processing for notifying the receiver of outsider detection information.

16 Claims, 10 Drawing Sheets

(51) Int. Cl.
    *G05D 1/02*    (2020.01)
    *G08B 7/06*    (2006.01)

(56) References Cited

U.S. PATENT DOCUMENTS

| | | | |
|---|---|---|---|
| 2015/0193936 A1* | 7/2015 | Warzelhan | G06T 7/75 |
| | | | 382/103 |
| 2017/0301220 A1* | 10/2017 | Jarrell | G05D 1/0022 |
| 2019/0228667 A1* | 7/2019 | Matsumoto | G08G 5/0026 |
| 2020/0033155 A1* | 1/2020 | Appelman | G01C 21/3848 |
| 2020/0125122 A1* | 4/2020 | Chen | B60W 20/15 |
| 2020/0159227 A1* | 5/2020 | Cohen | G01C 21/30 |

* cited by examiner

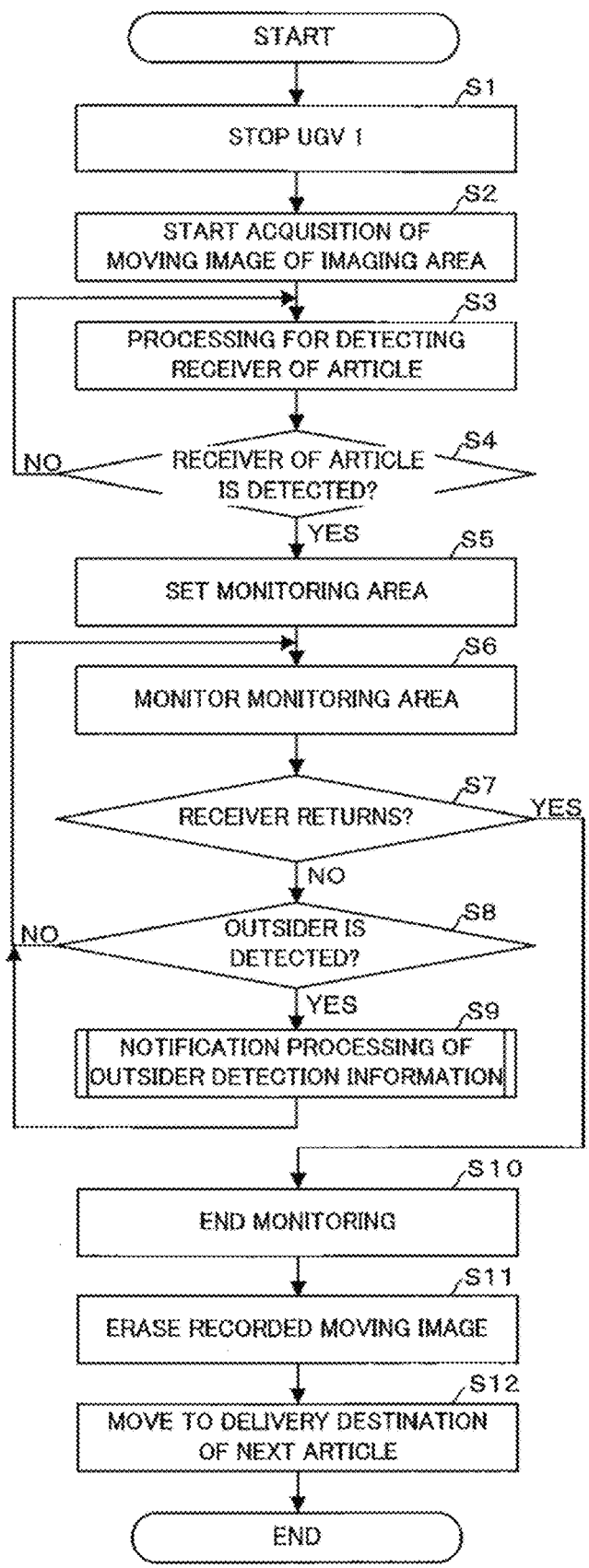

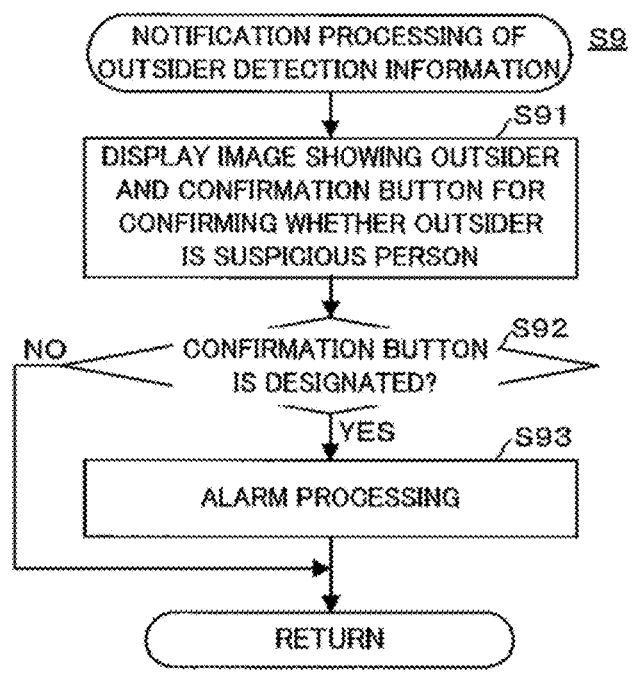

MONITORING SYSTEM AND UNMANNED GROUND VEHICLE

CROSS REFERENCE TO RELATED APPLICATIONS

This application is a National Stage of International Application No. PCT/JP2020/047980 filed Dec. 22, 2020.

TECHNICAL FIELD

The present invention relates to a technical field such as a monitoring system that monitors intrusion using an imaging device.

BACKGROUND ART

Conventionally, a monitoring system that monitors intrusion into a house or the like is known. For example, Patent Literature 1 discloses a monitoring system configured such that, when an intruder is detected by a sensor that detects an intruder into a monitoring area such as an entrance, an email is transmitted to a monitoring side and an image captured by a camera installed in the monitoring area is transferred to the monitoring side at predetermined timing via a wireless network. On the other hand, it has been studied that an unmanned vehicle delivers an article to any place such as a house. For example, Patent Literature 2 discloses a delivery system in which an unmanned vehicle delivers an article to any place such as a house and a receiver directly receives the article from the unmanned vehicle.

CITATION LIST

Patent Literature

Patent Literature 1: JP 2004-21604 A
Patent Literature 2: JP 2020-7148 A

SUMMARY OF INVENTION

Technical Problem

However, in the delivery system as disclosed in Patent Literature 2, for example, when the receiver coming out of the house or the like receives the article from the unmanned vehicle outdoors, there is a high possibility that the receiver turns his/her back to the house or the like. Therefore, there is a security risk such as intrusion into the house or the like by a suspicious person. In order to avoid such a security risk, for example, even if the monitoring system disclosed in Patent Literature 1 is used, it is difficult to avoid the security risk explained above because the area where the receiver comes out can change (that is, the monitoring area can change depending on an appearance position or the like of the receiver.). The same applies, for example, when the person coming from the house or the like passes an article to the unmanned vehicle or the like outdoors.

Therefore, one or more embodiments of the present invention are directed to providing a monitoring system and an unmanned vehicle capable of avoiding a security risk such as intrusion into a house or the like even when a monitoring area changes depending on an appearance position or the like of a person.

Solution to Problem

In response to the above issue, the invention according to claim 1 is a monitoring system that monitors a monitoring area using an imaging device. The monitoring system includes: an acquiring unit configured to acquire a moving image of an imaging area imaged by the imaging device; a first detecting unit configured to detect a first person on a basis of frame images forming the moving image; a first setting unit configured to set, as the monitoring area, an area including at least a part of the first person and the area at a point in time when the first person appears, the area being narrower than the imaging area; a second detecting unit configured to detect a second person entering the monitoring area or a second person heading for the monitoring area, the second person being a person different from the first person, on a basis of a frame image that is temporally later than a first frame image at the point in time when the first person appears; and a notification processing unit configured to execute processing for notifying the first person of information concerning the detection of the second person. Consequently, even when a monitoring area changes depending on an appearance position or the like of a person, it is possible to avoid a security risk such as intrusion into a house or the like.

The invention according to claim 2 is the monitoring system according to claim 1 further including an unmanned ground vehicle including the imaging device and the acquiring unit. Consequently, even when an imaging device such as a monitoring camera is not installed in a specific place such as a delivery destination of an article, it is possible to avoid a security risk such as intrusion into a house or the like.

The invention according to claim 3 is the monitoring system according to claim 2, wherein the unmanned ground vehicle is a ground vehicle that delivers an article to each of a plurality of different delivery destinations in an unmanned manner. The unmanned ground vehicle records the moving image acquired by the acquiring unit at one delivery destination in a memory and erases the moving image from the memory when heading to a next delivery destination after the article is received by the first person at the one delivery destination. This makes it possible to protect the privacy of a first person.

The invention according to claim 4 is the monitoring system according to claim 2 or 3, wherein the first detecting unit detects a person moving toward the unmanned ground vehicle as the first person. This makes it possible to accurately detect the first person to be identified.

The invention according to claim 5 is the monitoring system according to any one of claims 1 to 4 further including a second setting unit configured to detect a doorway on a basis of frame images forming the moving image and to set a range including the detected doorway as the imaging area.

The invention according to claim 6 is the monitoring system according to claim 5, wherein the first detecting unit detects a person exiting from the doorway as the first person. This makes it possible to accurately detect the first person to be identified.

The invention according to claim 7 is the monitoring system according to claim 5 or 6, wherein the second detecting unit detects, as the second person, a person that is about to enter the doorway or a person that has entered the doorway, the second person being different from the first person. This makes it possible to accurately detect the second person to be identified.

The invention according to claim 8 is the monitoring system according to any one of claims 1 to 7, wherein the first detecting unit detects a person performing a motion of receiving an article as the first person. This makes it possible to accurately detect the first person to be identified.

The invention according to claim 9 is the monitoring system according to any one of claims 1 to 8, wherein the first detecting unit detects a person coming out of a site as the first person. This makes it possible to accurately detect the first person to be identified.

The invention according to claim 10 is the monitoring system according to any one of claims 1 to 9, wherein the second detecting unit detects, as the second person, a person that is about to enter a site or a person that has entered the site, the second person being different from the first person. This makes it possible to accurately detect the second person to be identified.

The invention according to claim 11 is the monitoring system according to any one of claims 1 to 10, wherein the first detecting unit detects the first person using a face image registered in advance. This makes it possible to more accurately detect the first person to be identified.

The invention according to claim 12 is the monitoring system according to any one of claims 1 to 11, wherein the second detecting unit detects the second person on a basis of a comparison result of a size of the first person in the first frame image at a point in time when the first person appears and a size of a person appearing in the frame image that is temporally later than the first frame image, the person appearing being different from the first person. This makes it possible to more accurately detect the second person to be identified.

The invention according to claim 13 is the monitoring system according to any one of claims 1 to 12, wherein the notification processing unit executes processing for notifying with light of information concerning detection of the second person. This makes it possible to more quickly alert the first person.

The invention according to claim 14 is the monitoring system according to any one of claims 1 to 13, wherein the notification processing unit executes processing for notifying with sound of information concerning detection of the second person. This makes it possible to more quickly alert the first person.

The invention according to claim 15 is the monitoring system according to any one of claims 1 to 14, wherein the notification processing unit executes processing for notifying with one or more images of information concerning detection of the second person. This makes it possible to more quickly alert the first person.

The invention according to claim 16 is an unmanned vehicle that monitors a monitoring area using an imaging device. The unmanned vehicle includes: an acquiring unit configured to acquire a moving image of an imaging area imaged by the imaging device; a first detecting unit configured to detect a first person on a basis of frame images forming the moving image; a first setting unit configured to set, as the monitoring area, an area including at least a part of the first person and the area at a point in time when the first person appears, the area being narrower than the imaging area; a second detecting unit configured to detect a second person entering the monitoring area or a second person heading for the monitoring area, the second person being a person different from the first person, on a basis of a frame image that is temporally later than a first frame image at the point in time when the first person appears; and a notification processing unit configured to execute processing for notifying the first person of information concerning detection of the second person.

Advantageous Effect of the Invention

According to one or more embodiments of the present invention, even when a monitoring area changes depending on an appearance position or the like of a person, it is possible to avoid a security risk such as intrusion into a house or the like.

BRIEF DESCRIPTION OF THE DRAWINGS

FIG. 9 is a flowchart illustrating an example of processing executed by the control unit 18 of the UGV 1.

FIG. 10 is a flowchart illustrating details of the notification processing illustrated in step S9.

DESCRIPTION OF EMBODIMENTS one or more embodiments of the present invention is explained below with reference to the drawings. Incidentally, the embodiments explained below is embodiments in the case where a monitoring system (surveillance system) that monitors a monitoring area (surveillance area) using an imaging device is applied to delivery (transportation) of an article.

[1. Configuration and Function Outline of a Monitoring System S]

Figure 1:
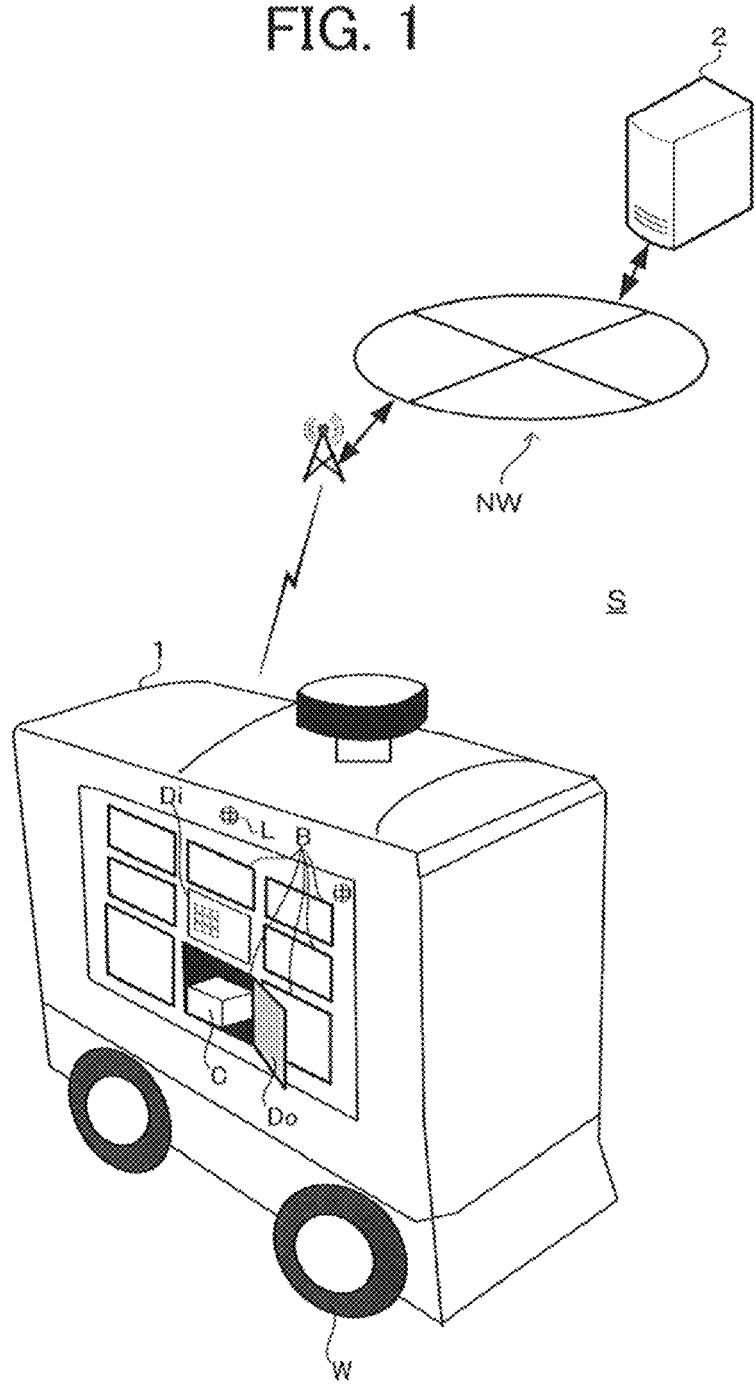
FIG. 1 is a diagram illustrating a schematic configuration example of a monitoring system S according to one or more embodiments.

First, a configuration and function outline of a monitoring system S according to the one or more embodiments is explained with reference to FIG. 1. FIG. 1 is a diagram illustrating a schematic configuration example of the monitoring system S according to the one or more embodiments. As illustrated in FIG. 1, the monitoring system S includes an UGV (Unmanned Ground Vehicle) 1 and a management server 2. The UGV 1 and the management server 2 are operated by a delivery company or the like. The UGV 1 and the management server 2 are connectable to a communication network NW and are communicable with each other via the communication network NW. The communication network NW is configured from, for example, the Internet and a mobile communication network and a radio base station thereof. Incidentally, although the UGV 1 illustrated in FIG. 1 indicates a vehicle including a plurality of wheels W, the UGV 1 may be a travel body such as a robot (for example, a biped walking robot) including no wheels.

The UGV 1 is an example of an unmanned ground vehicle capable of autonomously traveling in an unmanned manner. The UGV 1 delivers an article stored in a storage B (also referred to as storage box) to a delivery destination. The article can also be referred to as load or cargo. The article may be, for example, a commodity (an ordered product) ordered in an EC (Electronic Commerce) site. The delivery destination of the article may be, for example, a specific place having a doorway for a receiver (an example of a first person) of the article to enter and exit (that is, a person to appear.). Examples of such specific place include a house (a detached house or one room of an apartment), an office, a hotel room, and a cottage in a resort. Alternatively, the delivery destination of the article may be a simple tent installed in a specific place such as a camp site or a park, or a vehicle stopped in the specific place. The management server 2 manages information concerning delivery of the article and monitors a monitoring area at the delivery destination in cooperation with the UGV 1 in order to detect a person (hereinafter referred to as "outsider (third person) other than the receiver of the article. Here, the outsider (an example of a second person different from the first person) includes a suspicious person intruding from a doorway (for example, an entrance of a house) in the specific place explained above and a suspicious person who is highly likely to intrude from the doorway.

[1-1. Configuration and a Function of the UGV 1]

Figure 2:
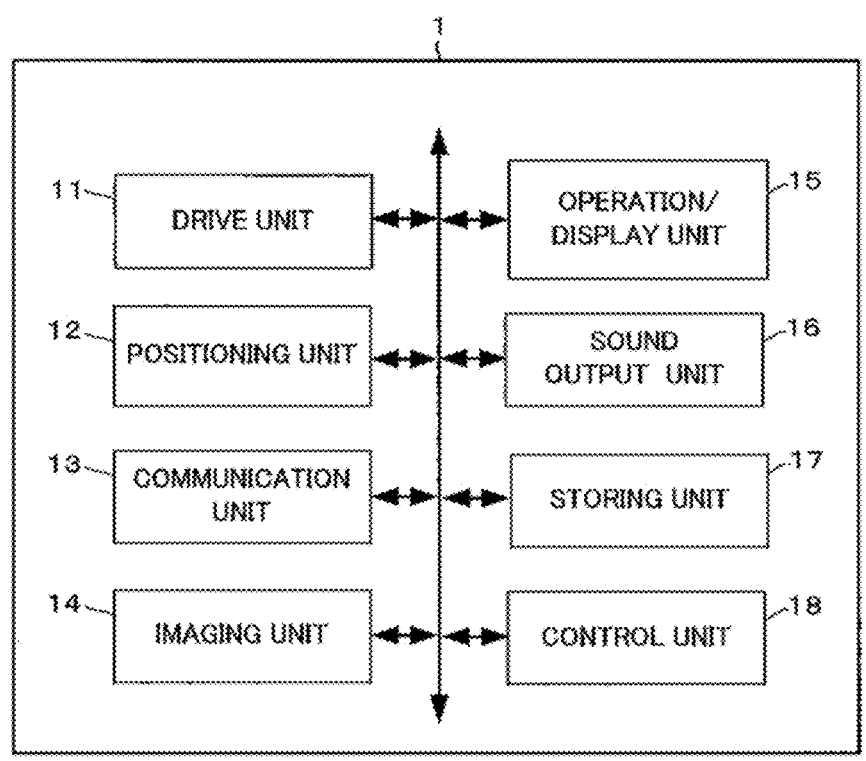
FIG. 2 is a diagram illustrating a schematic configuration example of an UGV 1.

Next, a configuration and a function of the UGV 1 are explained with reference to FIG. 2. FIG. 2 is a diagram illustrating a schematic configuration example of the UGV 1. As illustrated in FIG. 2, the UGV 1 includes a drive unit 11, a positioning unit 12, a communication unit 13, an imaging unit 14 (an example of an imaging device), an operation/display unit 15, a sound output unit 16, a storing unit 17, and a control unit 18. Moreover, the UGV 1 includes a battery (not illustrated) that supplies power to the units of the UGV 1, wheels W, and a storage B. Furthermore, as illustrated in FIG. 1, the UGV 1 may include a light L (for example, an LED) for notifying with light the receiver of the article of outsider detection information indicating that the outsider is detected (an example of information concerning detection of the outsider). Incidentally, in the example illustrated in FIG. 1, a plurality of storages B are provided, a door Do of the storage B at the lowermost stage in the center is opened, and an article C can be taken out.

The drive unit 11 includes a motor and a rotating shaft. The drive unit 11 rotates a plurality of wheels W with a motor, a rotating shaft, and the like driven according to a control signal output from the control unit 18. The positioning unit 12 includes a radio wave receiver. The positioning unit 12 receives, for example, a radio wave transmitted from a GNSS (Global Navigation Satellite System) satellite with a radio receiver and detects the current position (latitude and longitude) of the UGV 1 on the basis of the radio wave. Incidentally, the current position of the UGV 1 may be identified by SLAM (Simultaneous Localization And Mapping) processing in addition to the radio wave transmitted from the GNSS satellite. The current position of the UGV 1 may be corrected based on images captured (imaged) by the imaging unit 14. Position information indicating the current position detected by the positioning unit 12 is output to the control unit 18.

The communication unit 13 performs control of communication performed via the communication network NW. Moreover, the communication unit 13 may have a short-range wireless communication function such as Bluetooth (registered trademark) and perform short-range wireless communication with a terminal (for example, a smartphone) of the receiver. The imaging unit 14 includes, for example, a wide-angle camera such as an omnidirectional camera. The wide-angle camera is used for traveling control of the UGV 1 and monitoring at a delivery destination of the article. For example, the imaging unit 14 continuously captures a real space in an imaging area (imaging range) that falls within the angle of view of the wide-angle camera. A moving image (moving image data) of the imaging area captured by the imaging is output to the control unit 18. In particular, the moving image of the imaging area captured at the delivery destination of the article is used to detect the receiver of the article and the outsider. Incidentally, the imaging unit 14 may include a camera used for traveling control of the UGV 1 and a camera used for monitoring at the delivery destination of the article.

The operation/display unit 15 includes a display (touch panel) Di having an input function for receiving operation of a user such as the receiver and a display function for displaying information. For example, when the receiver inputs an unlocking code from the display Di, the door Do of the storage B is unlocked and opened. Alternatively, when near field wireless communication is performed between the UGV 1 and the terminal of the receiver, when the unlocking code is input from the terminal by the receiver through the application installed in the terminal and received by the communication unit 13, the door Do of the storage B is unlocked and opened. Moreover, the operation/display unit 15 is desirably used to notify the receiver of the article of outsider detection information with one or more images.

The sound output unit 16 includes a speaker that outputs sound. The sound output unit 16 is desirably used to notify the receiver of the article of the outsider detection information with sound. Moreover, the storing unit 17 is configured from a nonvolatile memory or the like and stores various programs and data. The storing unit 17 stores a machine body ID for identifying the UGV 1. Furthermore, the storing unit 17 is capable of recording a moving image of an imaging area captured in each of a plurality of different delivery destinations. However, after an article is received by a receiver at one delivery destination, the moving image may be deleted from the storing unit 17 (a memory) when the UGV 1 heads for the next delivery destination. This makes it possible to protect the privacy of the receiver of the article.

Figure 3:
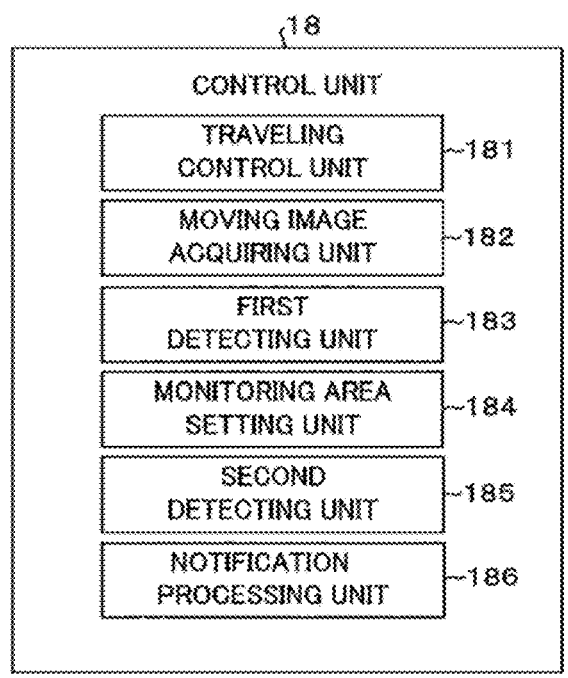
FIG. 3 is a diagram illustrating an example of functional blocks in a control unit 18.

The control unit 18 includes a CPU (Central Processing Unit), a ROM (Read Only Memory), and a RAM (Random Access Memory) and executes various kinds of processing according to a program stored in the ROM (or the storing unit 17). FIG. 3 is a diagram illustrating an example of functional blocks in the control unit 18. As illustrated in FIG. 3, the control unit 18 functions as a traveling control unit 181, a moving image acquiring unit 182 (an example of an acquiring unit), a first detecting unit 183, a monitoring area setting unit 184 (an example of a first setting unit), a second detecting unit 185, a notification processing unit 186, and the like.

The traveling control unit 181 performs traveling control for causing the UGV 1 to travel to the delivery destination of the article. In this traveling control, control of the number of rotations of the wheels W and control of the position and a traveling direction of the UGV 1 are performed using position information acquired from the positioning unit 12, a moving image acquired from the imaging unit 14, delivery destination information of the article, and the like. Consequently, the UGV 1 can autonomously travel to the delivery destination. Here, the delivery destination information of the article may be set in the UGV 1 at, for example, a shipping base of the article (in other words, an article loading base) or may be transmitted from the management server 2. The delivery destination information includes an article ID for identifying the article, location information of the delivery destination of the article, and receiver information of the article while being distinguished for each article. The location information of the delivery destination may be an address of the delivery destination or position information (latitude and longitude) of the delivery destination. The receiver information includes a user ID, a name, and an e-mail address for identifying the receiver of the article. Incidentally, the receiver information of the article may include a face image (photographic image data) of the receiver registered in advance. Moreover, when the UGV 1 arrives at the delivery destination of the article, the traveling control unit 181 stops, on the basis of the location information of the delivery destination, the UGV 1 in a position where the direction of the delivery destination can be confirmed.

Figure 4:
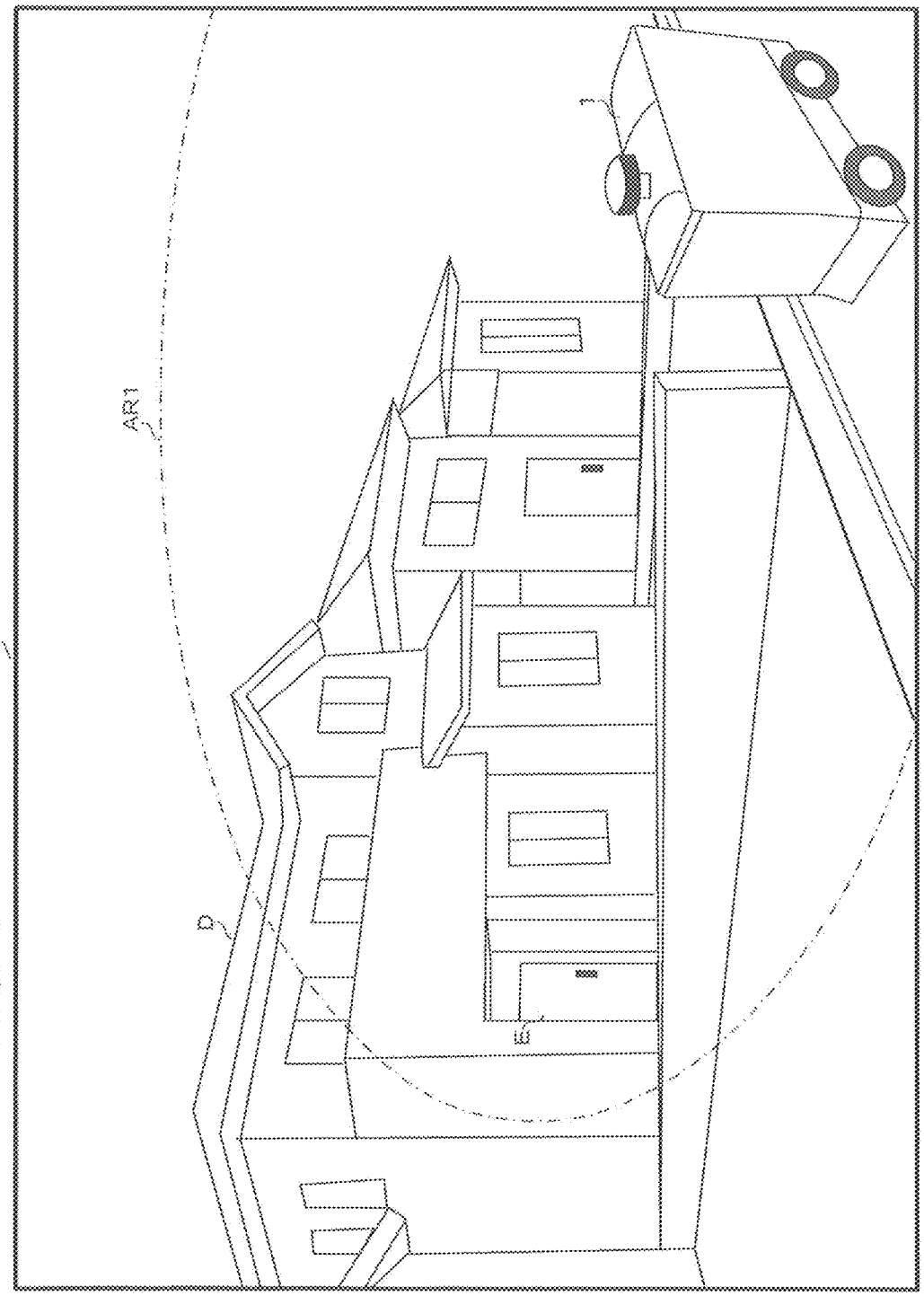
FIG. 4 is a diagram illustrating an example of an imaging area AR1 captured by the UGV 1 that arrives at a delivery destination D of an article in a frame image F1.

The moving image acquiring unit 182 acquires a moving image captured by the imaging unit 14. Such moving image is configured from a plurality of frame images. FIG. 4 is a diagram illustrating an example of an imaging area AR1 captured by the UGV 1 that arrives at a delivery destination D of the article in the frame image F1. In a frame image F1 illustrated in FIG. 4, a house D among a plurality of houses standing side by side is the delivery destination of the article and a doorway E of the house D is included in the imaging area AR1. Incidentally, the control unit 18 may function as a second setting unit, detect, on the basis of frame images forming a moving image around the delivery destination of the article, a doorway present at the delivery destination, and set a range including the detected doorway as an imaging area. However, when an omnidirectional camera capable of imaging a range of 360 degrees centering on the UGV 1 is used, even if an imaging area is not intentionally set, a range that falls within the angle of view of the omnidirectional camera when the UGV 1 arrives at the delivery destination may be set as the imaging area.

The first detecting unit 183 executes, on the basis of one or more frame images forming the moving image acquired by the moving image acquiring unit 182, processing for detecting the receiver of the article. Here, the receiver of the article can be detected by analyzing the frame images. As a first method of detecting the receiver, the first detecting unit 183 desirably detects a doorway of the delivery destination (for example, a house or a vehicle) from the frame images and detects a person exiting from the detected doorway (that is, an appearing person) as the receiver of the article. Incidentally, the detected doorway and the person exiting from the doorway are stored in association with each other. Alternatively, as a second method of detecting the receiver, the first detecting unit 183 may detect the site of the delivery destination (for example, a house) from the frame images and detect the person coming out of the detected site as the receiver of the article. Incidentally, instead of the detection of the site, a gate set in a boundary between the site and the outside of the site may be detected. In this case, a person coming out of the detected gate is detected as the receiver of the article.

Alternatively, as a third method of detecting the receiver, the first detecting unit 183 may detect a person appearing (showing up) in the frame images and moving toward the UGV 1 as the receiver of the article. Alternatively, as a fourth method of detecting the receiver, the first detecting unit 183 may detect a person appearing in the frame images and is performing a motion of receiving the article as the receiver of the article. Here, examples of the motion of receiving the article include a motion of taking out the article from the storage B and a motion of inputting an unlocking code to the UGV 1. The motion of inputting the unlocking code to the UGV 1 may be a motion of inputting the unlocking code from the display Di or a motion of inputting the unlocking code from a terminal of the receiver. Alternatively, when a face image is registered in advance in association with the article ID of the article, as a fifth detecting method, the first detecting unit 183 may detect the receiver of the article using the face image registered in advance. In this case, the first detecting unit 183 collates a face of a person in the frame images with the face image registered in advance and detects the person in the frame images as the receiver of the article if a matching degree is equal to or greater than a threshold.

As explained above, the receiver to be identified can be accurately detected by any one of the first to fifth detecting methods. Furthermore, in order to further improve the accuracy of identifying the receiver of the article, the receiver of the article may be detected by a combination of any two or more of the first to fifth detecting methods. For example, the first detecting unit 183 detects and tracks a person coming out from the doorway (or the site) detected as explained above and identifies the person as the receiver of the article if the tracked person is heading for the UGV 1. Alternatively, the first detecting unit 183 may detect and track a person coming out of the detected doorway (or the site) as explained above, and identify the person as the receiver of the article if the tracked person is performing an operation of receiving the article. Alternatively, the first detecting unit 183 may detect a person coming out from the doorway (or the site) detected as explained above and identify the detected person as the receiver of the article if a matching degree of a face of the detected person and a face image registered in advance is equal to or greater than a threshold.

The monitoring area setting unit 184 sets, as a monitoring area, an area including at least a part (for example, the upper body of the receiver) of the receiver detected by the first detecting unit 183 and the area at the point in time when the receiver appears, the area being narrower than the imaging area (for example, an area around the doorway where the receiver appears.). Here, the area at the point in time when the receiver appears is an area in a first frame image representing at least a part of the receiver and is the area fixed also in a frame image temporally after the first frame image (that is, an area where a position does not change according to the movement of the receiver.). In this way, by narrowing the monitoring area to an appropriate range from the imaging area, it is possible to prevent unnecessary detection such as detection of a passer-by passing near the UGV 1 as much as possible.

Figure 5:
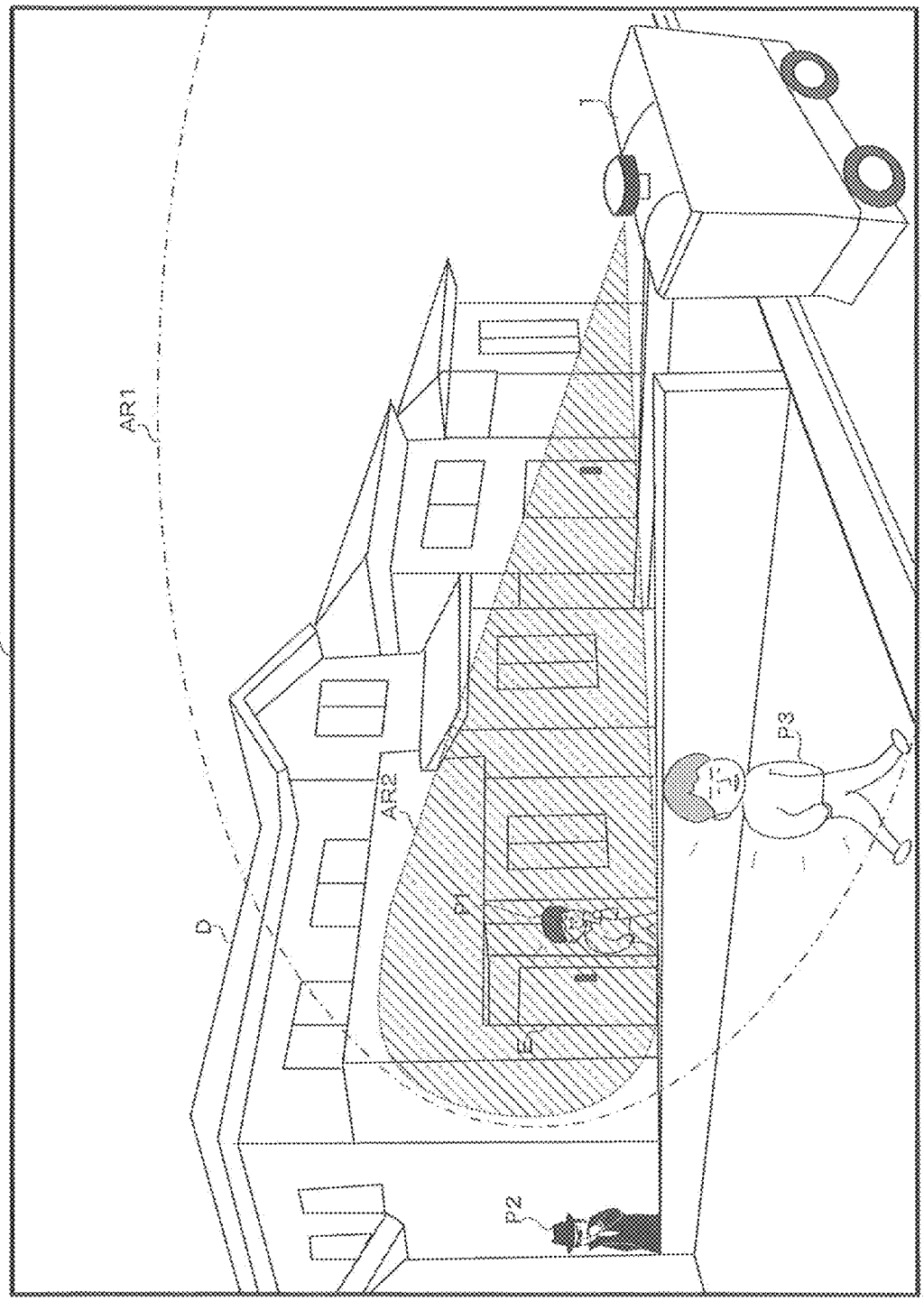
FIG. 5 is a diagram illustrating an example of the imaging area AR1 and a monitoring area AR2 in a frame image F2.
Figure 6:
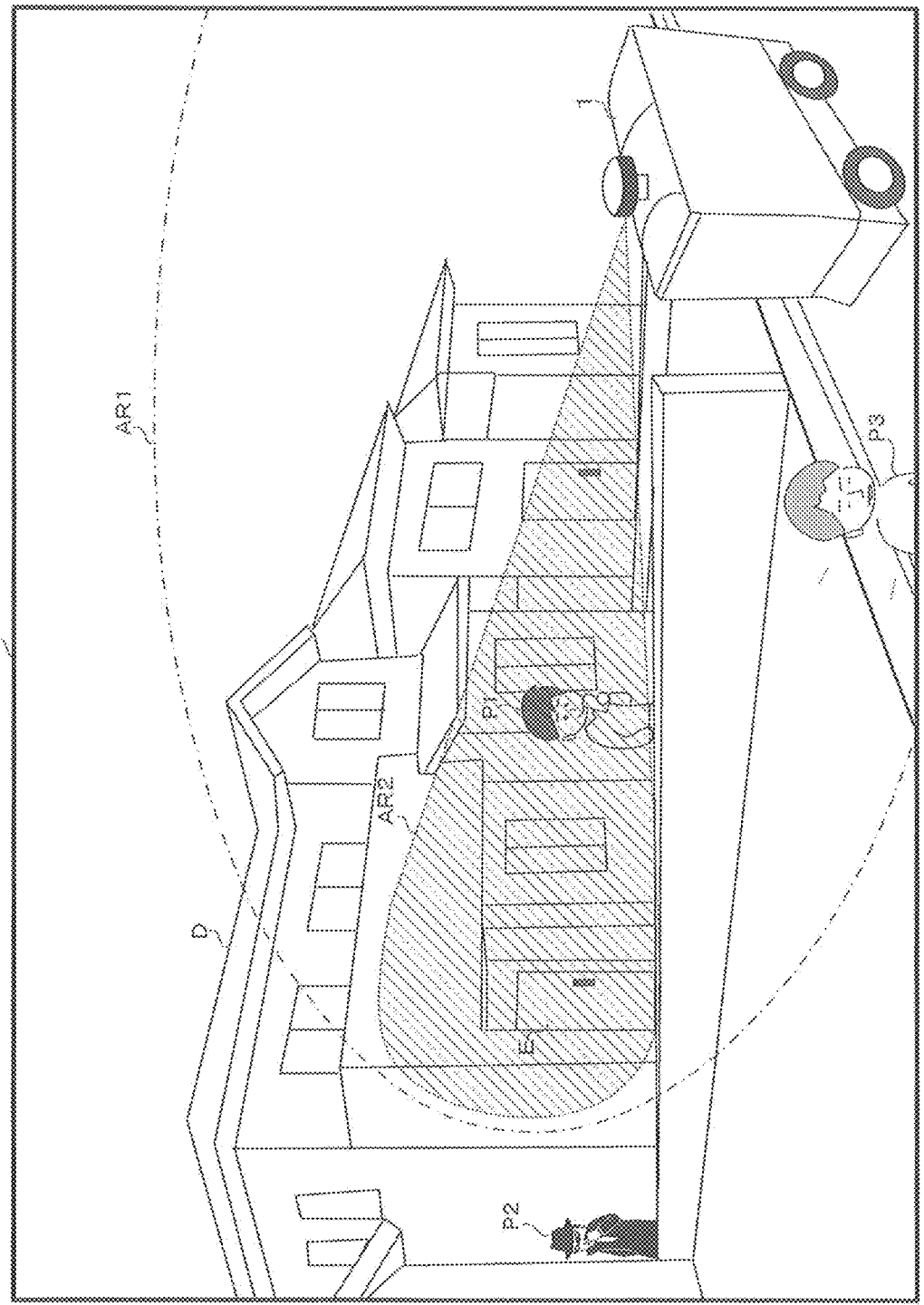
FIG. 6 is a diagram illustrating an example of the imaging area AR1 and the monitoring area AR2 in a frame image F3 temporally after the frame image F2 illustrated in FIG. 5.

FIG. 5 is a diagram illustrating an example of the imaging area AR1 and a monitoring area AR2 in a frame image F2. FIG. 6 is a diagram illustrating an example of the imaging area AR1 and the monitoring area AR2 in a frame image F3 temporally after the frame image F2 illustrated in FIG. 5. In the frame image F2 illustrated in FIG. 5, the monitoring area AR2 at a point in time when a receiver P1 of an article comes out from the doorway E is set in the imaging area AR1. Then, the monitoring area AR2 is set in the same position as illustrated in FIG. 6 also in the frame image F3 temporally after the frame image F2. The same applies to frame images temporally after the frame image F3. Incidentally, in the frame images F2 and F3 illustrated in FIGS. 5 and 6, a suspicious person P2 and a passer-by P3 appear but do not enter the monitoring area AR2.

Figure 7:
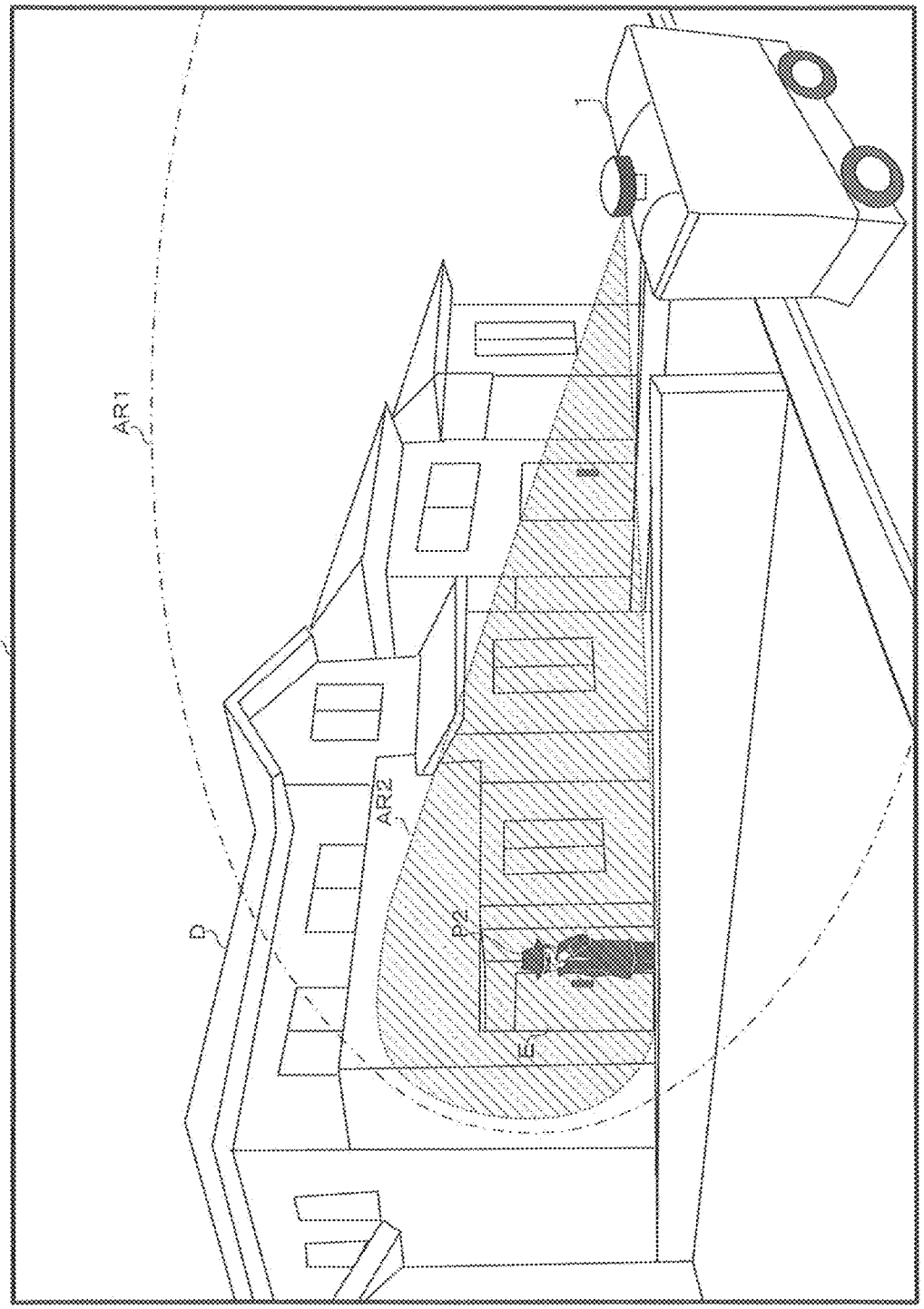
FIG. 7 is a diagram illustrating an example of the imaging area AR1 and the monitoring area AR2 in a frame image F4 temporally after the frame image F3 illustrated in FIG. 6.

The second detecting unit 185 executes, on the basis of a frame image temporally later than the first frame image F2 (i.e., a frame image temporally after the first frame image F2) at a point in time the receiver detected by the first detecting unit 183 appears, processing for detecting the outsider entering the monitoring area AR2 or the outsider heading for the monitoring area AR2. Consequently, even when the monitoring area changes depending on an appearance position of the receiver of the article, the outsider can be appropriately detected. Here, the outsider can be detected by analyzing the frame images. However, such outsider is not always a suspicious person and is sometimes a family member or an acquaintance of the receiver of the article. FIG. 7 is a diagram illustrating an example of the imaging area AR1 and the monitoring area AR2 in a frame image F4 temporally after the frame image F3 illustrated in FIG. 6. In the example illustrated FIG. 7, the suspicious person P2 entering the monitoring range AR2 is detected. Incidentally, the suspicious person P2 may also be detected when the suspicious person P2 does not enter the monitoring range AR2 but is moving in the direction of the monitoring range AR2 and the distance to the monitoring area AR2 is equal to or smaller than a predetermined distance.

As a more preferable example, the second detecting unit 185 may detect a person that is about to enter the doorway in the monitoring area AR2 or a person that has entered the doorway as the outsider. Consequently, the outsider to be identified can be accurately detected. Here, the person about to enter the doorway is desirably detected on condition that, for example, the person is moving in the direction of the doorway and the distance to the doorway is equal to or smaller than a predetermined distance. Alternatively, the person about to enter the doorway may be detected on condition that the person has opened a door set in the doorway. Incidentally, when the person opening the door set in the doorway is a person exiting from the doorway, the person is desirably not detected as the outsider. Alternatively, the second detecting unit 185 may detect a person about to enter the site in the monitoring area AR2 or a person that has entered the site as the outsider. Here, the person about to enter the site is desirably detected on condition that, for example, the person is moving from the outside of the site in the site and the distance to the site (that is, the distance between the person and the site) is equal to or smaller than a predetermined distance. Alternatively, the person about to enter the site may be detected on condition that the person has opened a gate set in the boundary between the site and the outside of the site. Incidentally, when the person opening the gate set in the boundary between the site and the outside of the site is a person coming out from the site, the person is desirably not detected as the outsider.

As a more preferable example, the second detecting unit 185 may detect the outsider on the basis of a comparison result of the size of the receiver in the first frame image F2 at a point in time when the receiver detected by the first detecting unit 183 appears and the size of a person (a person other than the receiver) appearing in a frame image that is temporally later than the frame image F2. Consequently, the outsider to be identified can be more accurately detected. For example, when the size of the receiver in the frame image F2 and the size of the person appearing in the frame image temporally after the frame image F2 are similar sizes (for example, when the difference between the sizes of the faces of the persons is equal to or smaller than a threshold), the second detecting unit 185 detects the person appearing in the frame image temporally after the frame image F2 as the outsider. Here, The reason of determining whether the sizes are similar sizes is to detect the outsider present near a position where the receiver appears (for example, the doorway). For example, in FIG. 5, the receiver P1 and the suspicious person P2 have similar sizes, but the receiver P1 and the passer-by P3 do not have similar sizes. Therefore, even if the passer-by P3 enters the monitoring area AR2, the passer-by P3 is not detected as the outsider. In this case, for example, it can be determined that the passer-by P3 is crossing the UGV 1.

The notification processing unit 186 executes processing for notifying the receiver detected by the first detecting unit 183 of outsider detection information. Consequently, it is possible to more quickly alert the receiver of the article. For example, the notification processing unit 186 notifies the receiver of the article of the outsider detection information with light by lighting or flashing the light. Alternatively, the control unit 18 may notify of the outsider detection information with sound by causing a speaker of the sound output unit 16 to output an alarm (that is, amplifying sound from the speaker). Alternatively, the notification processing unit 186 may cause the communication unit 13 to transmit an e-mail indicating the outsider detection information to the e-mail address of the receiver of the article. Alternatively, the notification processing unit 186 may cause the communication unit 13 to transmit the outsider detection information to an application resident in the terminal of the receiver of the article. Incidentally, even when the outsider detected by the second detecting unit 185 is not a suspicious person, it is meaningful to attract attention by notifying the receiver of the article of the outsider detection information.

Alternatively, the notification processing unit 186 may notify of the outsider detection information by causing the display Di of the operation/display unit 15 to display one or more images (a video) showing the outsider. Incidentally, when the near field wireless communication is performed between the UGV 1 and the terminal of the receiver, the notification processing unit 186 may notify of the outsider detection information with one or more images through the near field wireless communication and an application installed in the terminal by causing a display of the terminal to display one or more showing the outsider. Moreover, the notification processing unit 186 may cause the display Di or the display of the terminal to display a confirmation button for confirming with the receiver whether the outsider in the image displayed as explained above is a suspicious person. In this case, for example, when the confirmation button is designated (pressed) by the receiver, the notification processing unit 186 recognizes that the outsider shown in the displayed image is suspicious person and executes predetermined alarm processing. Here, examples of the alarm processing include processing for notifying the receiver not to return home with voice or display, processing for providing one or images showing a suspicious person to police, and processing for requesting another UGV to monitor the vicinity of the delivery destination.

[1-2. Configuration and a Function of Management Server 2]

Figure 8:
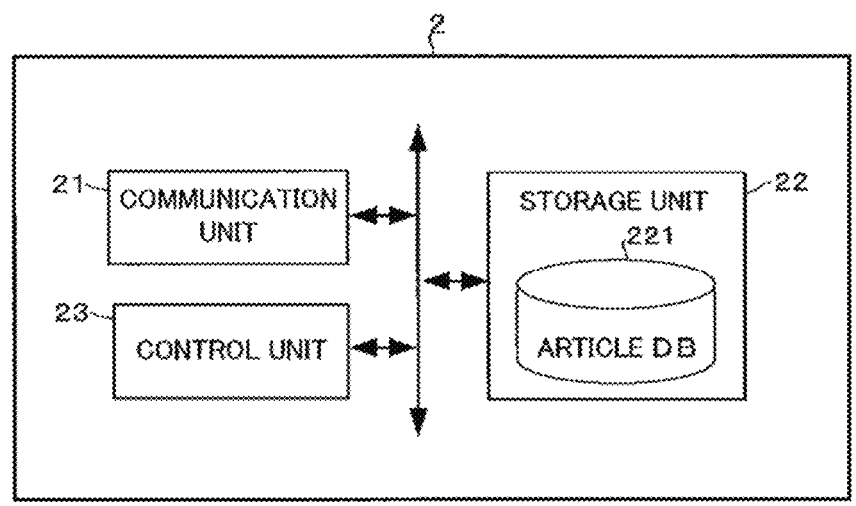
FIG. 8 is a diagram illustrating a schematic configuration example of a management server 2.

Next, a configuration and a function of the management server 2 are explained with reference to FIG. 8. FIG. 8 is a diagram illustrating a schematic configuration example of the management server 2. As illustrated in FIG. 8, the management server 2 includes a communication unit 21, a storing unit 22, and a control unit 23. The communication unit 21 performs control of communication performed via the communication network NW. The storing unit 22 is configured from, for example, a hard disk drive and stores various programs and data. For example, an article database (DB) 221 and the like are constructed in the storing unit 22. In the article database 221, an article ID of an article, location information of a delivery destination of the article, receiver information of the article, an arrival time period of the article, a release code, a machine body ID of the UGV 1 that delivers the article, and the like are stored in association with one another for each article. Here, the location information of the delivery destination of the article, the receiver information, and the arrival time period are stored in the article database 221, for example, when a delivery requester or the receiver accesses a predetermined site from a terminal and performs a delivery request procedure. The release code is a code necessary for unlocking the door Do of the storage B storing the article. For example, notification of the release code and the arrival time zone are provided in advance by e-mail to the e-mail address of the receiver of the article. The control unit 23 includes a CPU, a ROM, and a RAM and executes various kinds of processing according to a program stored in the ROM (or the storing unit 22). For example, the control unit 23 causes the communication unit 13 to transmit the delivery destination information to the UGV 1.

[2. Operation of Monitoring System S]

Next, an operation of the monitoring system S according to the present embodiment is explained with reference to FIG. 9 and FIG. 10. FIG. 9 is a flowchart illustrating an example of processing executed by the control unit 18 of the UGV 1. In this operation example, it is assumed that delivery destination information of an article is set in the UGV 1 in a shipping base where the article is loaded into the UGV 1. The delivery destination information includes an article ID of the article, location information of a delivery destination of the article, and receiver information of the article. Incidentally, the delivery destination information may be transferred from the management server 2 to the UGV 1.

The processing illustrated in FIG. 9 is started, for example, when the UGV 1 arrives at the delivery destination of the article. Incidentally, immediately before or when the UGV 1 arrives at the delivery destination of the article, the e-mail indicating that the UGV 1 has arrived may be transmitted to the e-mail address of the receiver of the article. When the processing illustrated in FIG. 9 is started, the control unit 18 stops, on the basis of the location information of the delivery destination of the article, the UGV 1 in a position where a delivery destination direction can be confirmed (step S1). Next, the control unit 18 causes the imaging unit 14 to perform capturing (imaging) in the delivery destination direction in a wide range from the stop position of the UGV 1, starts acquisition of a moving image of the imaging area, and records the moving image in the storing unit 17 (step S2).

Next, the control unit 18 executes, on the basis of frame images forming the acquired moving image, processing for detecting the receiver of the article as explained above (step S3). Next, the control unit 18 determines whether the receiver of the article is detected (step S4). When it is determined that the receiver of the article is detected (step S4: YES), the processing proceeds to step S5. At this time, for example, since the UGV 1 is on standby in front of the receiver's home, it is assumed that the receiver of the article goes to the UGV 1 to pick up the article without closing a door of an entrance. On the other hand, when it is determined that the receiver of the article is not detected (step S4: NO), the processing returns to step S3. Incidentally, when it is determined that the receiver of the article is not detected, for example, it may be determined whether a predetermined time (for example, about several ten minutes) has elapsed from the arrival. Then, when it is determined that the predetermined time has elapsed from the arrival, the processing proceeds to step S12.

In step S5, the control unit 18 sets, as the monitoring area, an area around an appearance position of the receiver (for example, the doorway of the house) detected in step S4 and the area at a point in time when the receiver appears. Next, the control unit 18 monitors, on the basis of the frame image that is temporally later than the first frame image at the point in time when the receiver appears, the monitoring area set in step S5 (step S6). In such monitoring, processing for tracking the receiver of the article and processing for detecting the outsider other than the receiver are executed.

Next, the control unit 18 determines whether the receiver to be tracked has received the article from the UGV 1 and returned to the appearance position (for example, has returned home) (step S7). If it is determined that the receiver to be tracked has not received the article from the UGV 1 or that the receiver has received the article from the UGV 1 but has not returned (step S7: NO), the processing proceeds to step S8. On the other hand, when it is determined that the receiver has received the article from the UGV 1 and has returned to the appearance position (step S7: YES), the monitoring is ended (step S10), and the processing proceeds to step S11.

In step S8, the control unit 18 determines whether the outsider entering the monitoring area set in step S5 or heading for the monitoring area is detected. when it is determined that the outsider is detected (step S8: YES), the processing proceeds to step 39. On the other hand, when it is determined that the outsider is not detected (step S8: NO), the processing returns to step S6.

Incidentally, when it is determined in step S8 that the outsider is detected, the control unit 18 may collate a face photograph of a person registered in advance on the basis of suspicious person information (for example, a wanted criminal) with a face of the detected outsider. Then, when a matching degree of the face photograph and the face of the outsider is equal to or greater than a threshold, it is determined that the outsider is a suspicious person performing a suspicious act, and the alarm processing explained above is desirably executed. On the other hand, when the matching degree of the face photograph and the face of the outsider is not equal to or greater than the threshold, the processing desirably proceeds to step S9.

Moreover, when it is determined in step S8 that the outsider is detected, the control unit 18 may collate a face photograph of a person registered in advance as a person notification of which is not to be provided (for example, a family member or an acquaintance of the receiver of the package) with a face of the detected outsider. Then, when a matching degree of the face photograph and the face of the outsider is equal to or greater than a threshold, it is determined that the outsider is a person notification of which is not to be provided, and the processing desirably returns to step S6.

In step S9, the control unit 18 executes notification processing of outsider detection information. FIG. 10 is a flowchart illustrating details of the notification processing illustrated in step S9. When the processing illustrated in FIG. 10 is started, the control unit 18 causes, for example, the display Di to display one or more images showing the outsider detected in step S8 among frame images forming an acquired moving image and a confirmation button for confirming whether the outsider is a suspicious person (step S91). Here, the images showing the outsider may be a moving image (that is, moving image reproduction).

Next, the control unit 18 determines whether the displayed confirmation button is designated by the receiver within a predetermined time (step S92). When it is determined that the displayed confirmation button is not designated by the receiver within the predetermined time (step S92: NO), the processing returns to the processing illustrated in FIG. 9. In this case, in the subsequent processing, the outsider shown in the one or more images is desirably set as a person not to be detected.

On the other hand, when it is determined that the displayed confirmation button is designated by the receiver within the predetermined time (step S92: YES), the alarm processing explained above is executed (step S93), and the processing returns to step S6. Incidentally, when it is determined in step S8 that the outsider is detected, notification of outsider detection information may be provided with light by lighting or flashing a light or the notification of the outsider detection information may be provided with sound by causing the speaker of the sound output unit 16 to output an alarm instead of the processing illustrated in FIG. 10 or together with the processing illustrated in FIG. 10.

In step S11, the control unit 18 erases the moving image started to be acquired in step S2 and recorded in the storing unit 17. The control unit 18 moves the UGV 1 toward a delivery destination of a next article (step S12). Thereafter, the processing illustrated in FIG. 9 ends once and is started again when the UGV 1 arrives at the delivery destination of the next article.

As explained above, according to the embodiment explained above, the moving image of the imaging area captured by the UGV 1 is acquired, the receiver of the article is detected based on the frame images forming the moving image, the area including at least a part of the receiver and the area at the point in time when the receiver appears is set as the monitoring area, the outsider entering the monitoring area or heading for the monitoring area is detected based on the frame image that is temporally later than the first frame image at the point in time when the receiver appears, and the receiver is notified of the outsider detection information. Therefore, even when the monitoring area changes depending on an appearance position of the receiver of the article, security risks such as intrusion into a house or the like can be avoided. Moreover, in the embodiment explained above, since the UGV 1 includes the imaging unit 14 and is configured to acquire a moving image of an imaging area captured by the imaging unit 14, even when an imaging device such as a monitoring camera is not set in a specific place such as a delivery destination of an article, security risks such as intrusion into a house or the like can be avoided, and the UGV 1 can be effectively utilized compared with the related art.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. The embodiment explained above can also be applied, for example, when a person appears from behind (for example, from the back of) an object such as a building (that is, appears from a place other than a doorway).

Moreover, the embodiment explained above can also be applied when a commodity is sold to the receiver in the UGV 1 also serving as a vending machine at a delivery destination. For example, the UGV 1 detects, on the basis of frame images forming a moving image of an imaged imaging area, a person purchasing an article from the UGV 1 with the detecting method explained above as the first person. Then, the UGV 1 sets an area including at least a part of the person purchasing the article and the area at a point in time when the person purchasing the article appears, the area being narrower than the imaging area, as the monitoring area, detects the outsider in the same manner as in the embodiment explained above, and notifies the person purchasing the article of outsider detection information.

Moreover, the embodiment explained above can also be applied when the UGV 1 receives an article from a person in a specific place other than a delivery destination. For example, the UGV 1 detects, on the basis of frame images forming a moving image of an captured imaging area, a person passing an article to the UGV 1 (for example, a person depositing an article) with the detecting method explained above as the first person. Then, the UGV 1 sets an area including at least a part of the person passing the article and the area at a point in time when the person delivering the article appears, the area being narrower than the imaging area, as the monitoring area, detects the outsider in the same manner as in the embodiment explained above, and notifies the person passing the article of outsider detection information.

Moreover, the embodiment explained above can also be applied to a case other than exchange of an article by the UGV 1. As an example of such a case, the UGV 1 communicates predetermined information to a person. For example, the UGV 1 detects, on the basis of frame images forming a moving image of an captured imaging area, a person receiving information from the UGV 1 (for example, receiving information through sound output or display output) with the detecting method explained above as the first person. Then, the UGV 1 sets an area including at least a part of the person receiving the information and the area at a point in time when the person receiving the information appears, the area being narrower than the imaging area, as the monitoring area, detects the outsider in the same manner as in the embodiment explained above, and notifies the person receiving the information of the outsider detection information.

Moreover, in the embodiment explained above, an example in the case in which the moving image acquiring unit 182, the first detecting unit 183, the monitoring area setting unit 184, the second detecting unit 185, and the notification processing unit 186 are provided in the control unit 18 of the UGV 1 is explained. However, all or a part of the functions of these components may be included in the control unit 23 of the management server 2. In this case, the UGV 1 transmits a moving image of an imaging area captured by the imaging unit 14 to the management server 2 via the communication network NW. The management server 2 acquires the moving image transmitted from the UGV 1 and detects a first person with the detecting method explained above on the basis of frame images forming the moving image. Then, the management server 2 sets an area including at least a part of the first person and the area at a point in time when the first person appears, the area being narrower than the imaging area as a monitoring area and detects the outsider in the same manner as in the embodiment explained above. Then, the management server 2 notifies the detected first person of outsider detection information by e-mail. Alternatively, the management server 2 notifies the first person of the outsider detection information by transmitting the outsider detection information to the UGV 1 via the communication network NW.

When the management server 2 performs the functions of the moving image acquiring unit 182, the first detecting unit 183, the monitoring area setting unit 184, the second detecting unit 185, and the notification processing unit 186 in this way, the management server 2 may acquire a moving image captured by an imaging device other than the imaging unit 14 of the UGV 1. As such an imaging device, any monitoring camera among a plurality of monitoring cameras set in a specific area and connected to the communication network NW can be used. In this case, the management server 2 executes processing for acquiring a moving image transmitted from the monitoring camera, detecting a first person on the basis of frame images forming the moving image and setting the first person as the monitoring area, detecting the outsider as explained above, and notifying the first person of outsider detection information.

REFERENCE SIGNS LIST

1 UGV
2 Management server
11 Drive unit
12 Positioning unit
13 Communication unit
14 Imaging unit
15 Operation/display unit
16 Sound output unit
17 Storing unit
18 Control unit
181 Traveling control unit
182 Moving image acquiring unit
183 First detecting unit
184 Monitoring area setting unit
185 Second detecting unit
186 Notification processing unit
21 Communication unit
22 Storing unit
23 Control unit
NW Communication network
S Monitoring system

The invention claimed is:

1. A monitoring system that monitors a monitoring area using an imaging device, the monitoring system comprising:
an acquiring circuitry configured to acquire a moving image of an imaging area captured by the imaging device;
at least one memory configured to store program code; and at least one processor configured to access the program code and operate as instructed by the program code, the program code including:
first detecting code configured to cause the at least one processor to detect a first person on a basis of frame images forming the moving image;
first setting code configured to cause the at least one processor to set, as the monitoring area, an area including at least a part of the first person and the area at a point in time when the first person appears, the area being narrower than the imaging area;
second detecting code configured to cause the at least one processor to detect a second person entering the monitoring area or a second person heading for the monitoring area, the second person being a person different from the first person, on a basis of a frame image that is temporally later than a first frame image at the point in time when the first person appears; and
a notification processing circuitry configured to execute processing for notifying the first person of information concerning the detection of the second person.

2. The monitoring system according to claim 1, further comprising an unmanned ground vehicle including the imaging device and the acquiring circuitry.

3. The monitoring system according to claim 2, wherein the unmanned ground vehicle is a ground vehicle that delivers an article to each of a plurality of different delivery destinations in an unmanned manner, and
the unmanned ground vehicle records the moving image acquired by the acquiring circuitry at one delivery destination in a memory and erases the moving image from the memory when heading to a next delivery destination after the article is received by the first person at the one delivery destination.

4. The monitoring system according to claim 2, wherein the first detecting code causes the at least one processor to detects a person moving toward the unmanned ground vehicle as the first person.

5. The monitoring system according to claim 1, the program code further including second setting code configured to cause the at least one processor to detect a doorway on a basis of frame images forming the moving image and to set a range including the detected doorway as the imaging area.

6. The monitoring system according to claim 5, wherein the first detecting code causes the at least one processor to detects a person exiting from the doorway as the first person.

7. The monitoring system according to claim 5, wherein the second detecting code causes the at least one processor to detects, as the second person, a person that is about to enter the doorway or a person that has entered the doorway, the second person being different from the first person.

8. The monitoring system according to claim 1, wherein the first detecting code causes the at least one processor to detects a person performing a motion of receiving an article as the first person.

9. The monitoring system according to claim 1, wherein the first detecting code causes the at least one processor to detects a person coming out of a site as the first person.

10. The monitoring system according to claim 1, wherein the second detecting code causes the at least one processor to detects, as the second person, a person that is about to enter a site or a person that has entered the site, the second person being different from the first person.

11. The monitoring system according to claim 1, wherein the first detecting code causes the at least one processor to detects the first person using a face image registered in advance.

12. The monitoring system according to claim 1, wherein the second detecting code causes the at least one processor to detects the second person on a basis of a comparison result of a size of the first person in the first frame image at a point in time when the first person appears and a size of a person appearing in the frame image that is temporally later than the first frame image, the person appearing being different from the first person.

13. The monitoring system according to claim 1, wherein the notification processing code causes the at least one processor to executes processing for notifying with light of information concerning detection of the second person.

14. The monitoring system according to claim 1, wherein the notification processing code causes the at least one processor to executes processing for notifying with sound of information concerning detection of the second person.

15. The monitoring system according to claim 1, wherein the notification processing code causes the at least one processor to executes processing for notifying with one or more images of information concerning detection of the second person.

16. An unmanned vehicle that monitors a monitoring area using an imaging device, the unmanned vehicle comprising:
- at least one memory configured to store program code; and at least one processor configured to access the program code and operate as instructed by the program code, the program code including:
- acquiring code configured to cause the at least one processor to acquire a moving image of an imaging area captured by the imaging device;
- first detecting code configured to cause the at least one processor to detect a first person on a basis of frame images forming the moving image;
- first setting code configured to cause the at least one processor to set, as the monitoring area, an area including at least a part of the first person and the area at a point in time when the first person appears, the area being narrower than the imaging area;
- second detecting code configured to cause the at least one processor to detect a second person entering the monitoring area or a second person heading for the monitoring area, the second person being a person different from the first person, on a basis of a frame image that is temporally later than a first frame image at the point in time when the first person appears; and
- notification processing code configured to cause the at least one processor to execute processing for notifying the first person of information concerning detection of the second person.

* * * * *